US009007376B2

(12) United States Patent
Akaza et al.

(10) Patent No.: US 9,007,376 B2
(45) Date of Patent: Apr. 14, 2015

(54) GRAPH DISPLAY APPARATUS AND GRAPH DISPLAY METHOD

(75) Inventors: Shunsuke Akaza, Higashiyamato (JP); Rie Kai, Akishima (JP)

(73) Assignee: Casio Computer Co., Ltd., Tokyo (JP)

(*) Notice: Subject to any disclaimer, the term of this patent is extended or adjusted under 35 U.S.C. 154(b) by 774 days.

(21) Appl. No.: 13/038,475

(22) Filed: Mar. 2, 2011

(65) Prior Publication Data
US 2011/0234624 A1 Sep. 29, 2011

(30) Foreign Application Priority Data

Mar. 29, 2010 (JP) ................................. 2010-075841
May 28, 2010 (JP) ................................. 2010-123438

(51) Int. Cl.
*G06T 11/20* (2006.01)
*G09G 5/02* (2006.01)

(52) U.S. Cl.
CPC .................................... *G06T 11/206* (2013.01)

(58) Field of Classification Search
CPC .......................................... G06T 11/20–11/206
See application file for complete search history.

(56) References Cited

U.S. PATENT DOCUMENTS

2007/0120857 A1* 5/2007 Patel et al. .................... 345/440
2007/0126736 A1* 6/2007 Tolle et al. .................... 345/440
2010/0194754 A1* 8/2010 Alsbury et al. ............... 345/440

FOREIGN PATENT DOCUMENTS

| JP | 62-058379   | 3/1987  |
| JP | 7-105392 A  | 4/1995  |
| JP | 10-124690 A | 5/1998  |
| JP | 10-198741 A | 7/1998  |
| JP | 11-184819 A | 7/1999  |
| JP | 2000-132697 A | 5/2000 |
| JP | 2001-184318 A | 7/2001 |
| JP | 2001-250078 A | 9/2001 |
| JP | 2001-357021 A | 12/2001 |

OTHER PUBLICATIONS

Japanese Office Action dated Mar. 6, 2012 (and English translation thereof) in counterpart Japanese Application No. 2010-075841.
Japanese Office Action dated Jul. 26, 2011 (and English translation thereof) in counterpart Japanese Application No. 2010-123438.
Japanese Office Action dated May 28, 2013 (and English translation thereof) in counterpart Japanese Application No. 2012-170219.
Feature 1 Making Illustration by Excel, Nikkei PC21, Japan, Nikkei Business Publications, Inc., Sep. 1, 2005, vol. 10, No. 17, pp. 44-53.

* cited by examiner

*Primary Examiner* — Tize Ma
(74) *Attorney, Agent, or Firm* — Holtz, Holtz, Goodman & Chick PC

(57) ABSTRACT

There is provided a graph display apparatus including a list input unit configured to input list data including a plurality of numerical data items, a color designation unit configured to designate arbitrary colors for the numerical data items of the list data input by the list input unit, a list storage unit configured to store the list data input by the list input unit and information of the colors designated for the numerical data items by the color designation unit in a state where the list data and the information are associated with each other, and a graph display unit configured to color-display graph data, based on the list data and the information of the colors designated for the numerical data items, which are stored in the list storage unit.

7 Claims, 14 Drawing Sheets

(a)
LIST 1
| DATA 1 | BLACK |
|--------|-------|
| DATA 2 | BLACK |
| DATA 3 | BLACK |
| DATA 4 | RED |
| DATA 5 | BLACK |
| DATA 6 | RED |
| DATA 7 | BLUE |
| ... | ... |

(b)
LIST 2
| DATA 1 | BLACK |
|--------|-------|
| DATA 2 | BLACK |
| DATA 3 | BLACK |
| DATA 4 | RED |
| DATA 5 | BLACK |
| DATA 6 | RED |
| DATA 7 | BLUE |
| ... | ... |

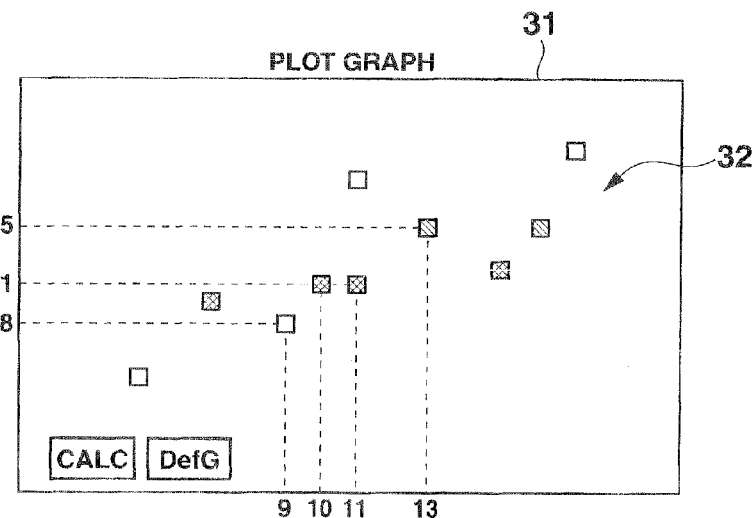

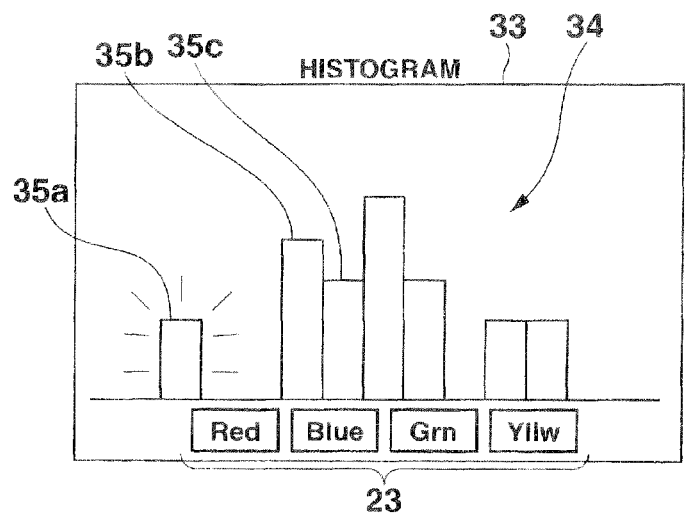
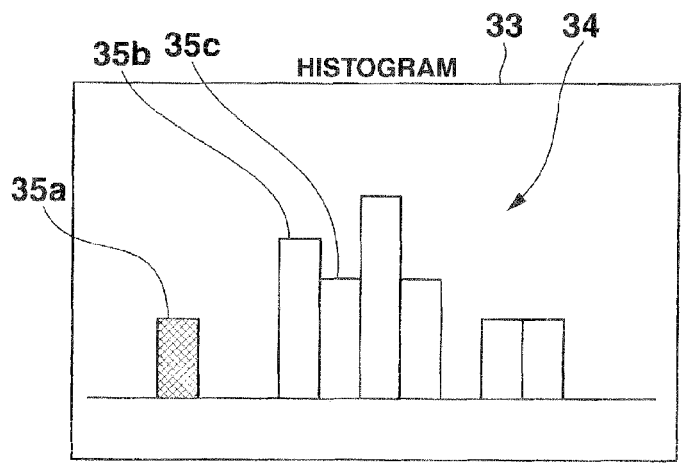
FIG.10
| (a) LIST 1 | | (b) LIST 1 | |
|---|---|---|---|
| 42 | BLACK | 42 | BLACK |
| 75 | BLACK | 75 | BLACK |
| 8 | BLACK | 8 | RED |
| ... | ... | ... | ... |
| 68 | BLACK | 68 | BLACK |
| 4 | BLACK | 4 | RED |
| 110 | BLACK | 110 | BLACK |
| ... | ... | ... | ... |

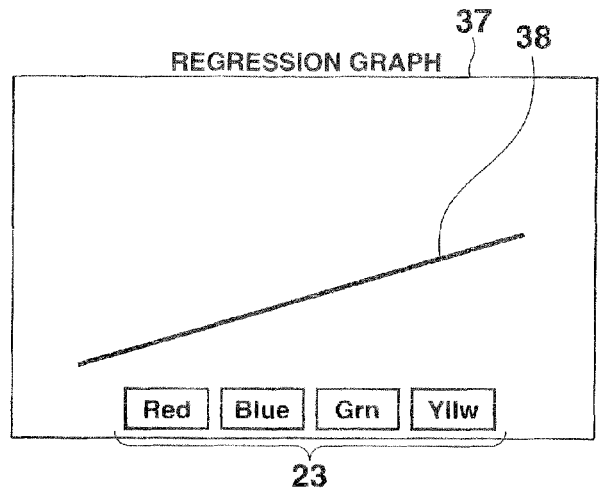
FIG.11
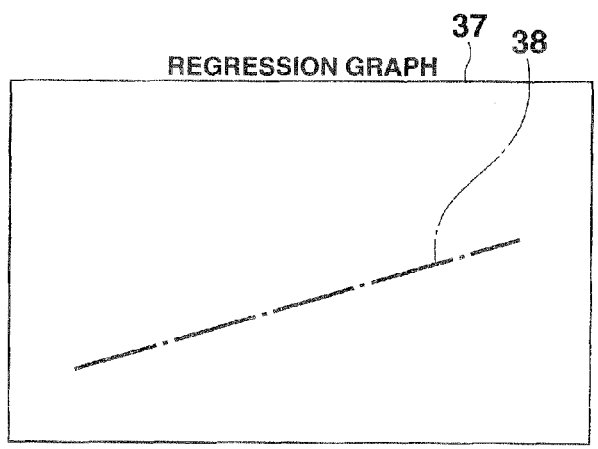
FIG.12
FIG.13
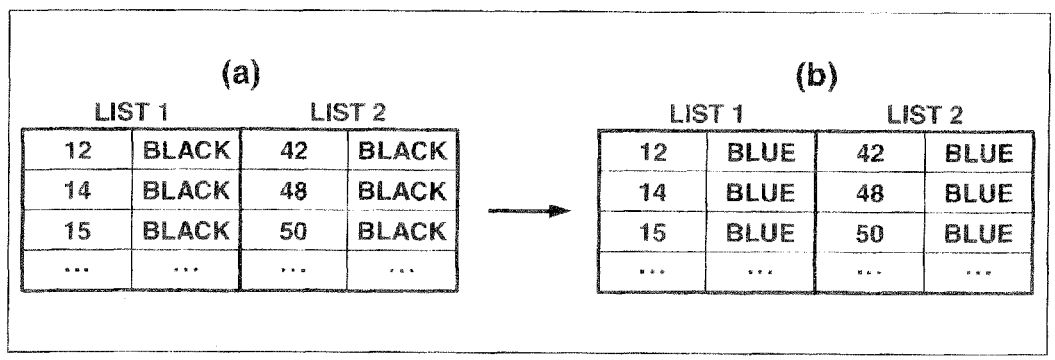

FIG.18

|   | (a) LIST 1 | 15c |
|---|---|---|
| 1 | 125 | BLACK |
| 2 | 110 | BLACK |
| 3 | 106 | BLACK |
| 4 | 156 | BLUE |
| 5 | 132 | BLACK |
| 6 | 110 | BLACK |
| 7 | 96 | RED |
| 8 | 122 | BLACK |
| 9 | 128 | BLACK |
| 10 | 118 | BLACK |

|   | 15c | (b) LIST 2 |
|---|---|---|
| 1 | 51 | BLACK |
| 2 | 48 | BLACK |
| 3 | 55 | BLACK |
| 4 | 60 | RED |
| 5 | 45 | BLACK |
| 6 | 44 | BLACK |
| 7 | 40 | BLUE |
| 8 | 62 | RED |
| 9 | 50 | BLACK |
| 10 | 45 | BLACK |

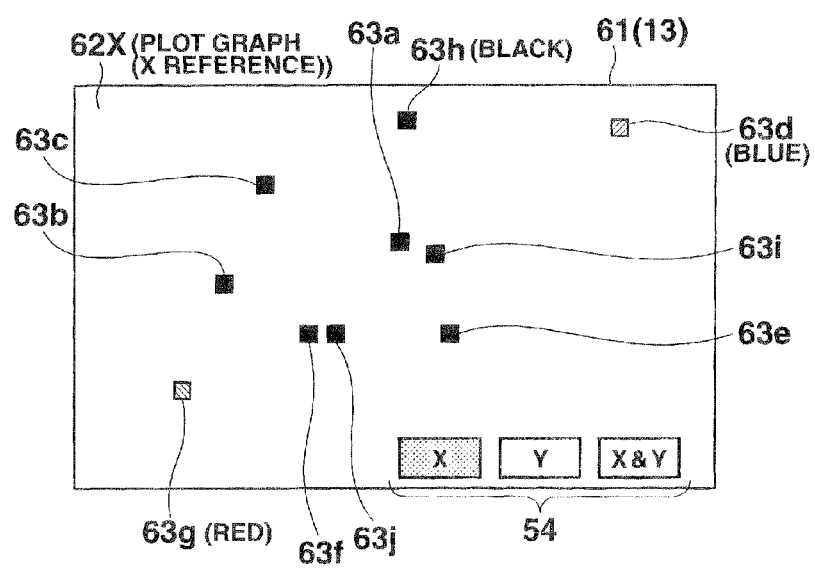

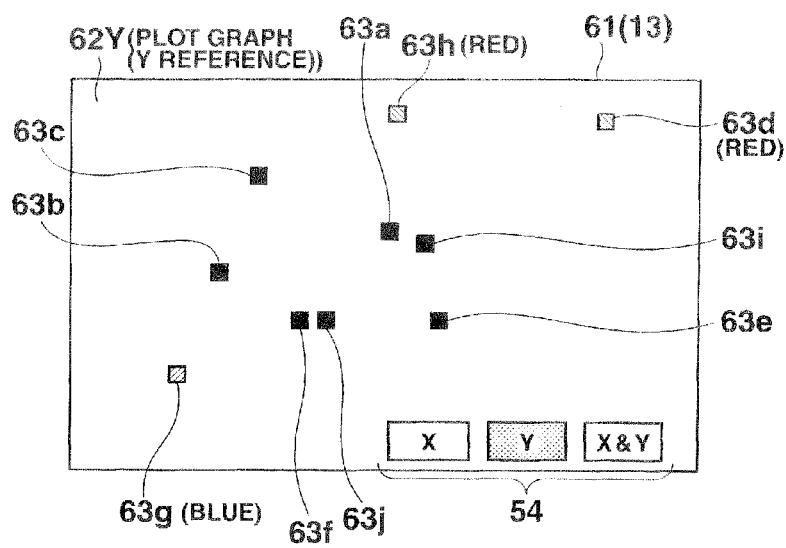
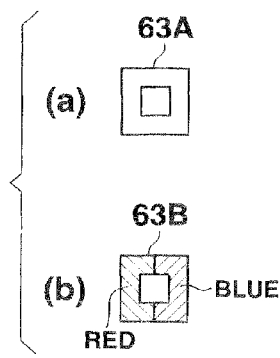
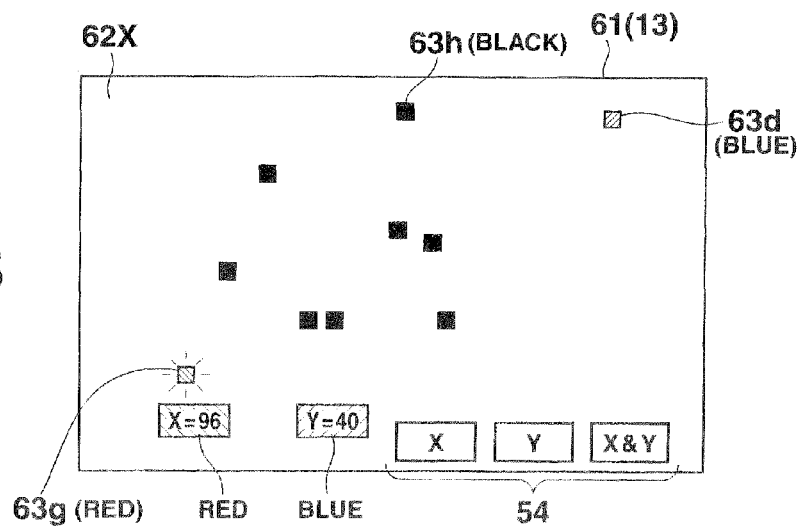

GRAPH DISPLAY APPARATUS AND GRAPH DISPLAY METHOD

CROSS-REFERENCE TO RELATED APPLICATIONS

This application is based upon and claims the benefit of priority from prior Japanese Patent Applications No. 2010-075841, filed Mar. 29, 2010; and No. 2010-123438, filed May 28, 2010, the entire contents of both of which are incorporated herein by reference.

BACKGROUND OF THE INVENTION

1. Field of the Invention

The present invention relates to a graph display apparatus having a function of drawing a graph based on list data including a plurality of numerical data items, and a graph display method.

2. Description of the Related Art

In an electronic calculator (scientific electronic calculator) having a functional calculus function, there is a function in which when a statistical calculation mode is set and list data (statistical data) is input, a graph corresponding to the input list data is drawn. The information, which is handled in this case, is "numerical data items constituting list data" and "graph data". Since the kinds of these data are different, it is difficult to compare the relationship in correspondency between these data.

Under the circumstances, in order to improve the visual expressive power of the electronic calculator, it has been thought that display is effected in color. For example, Jpn. Pat. Appln. KOKAI Publication No. H11-184819 (patent document 1) discloses that an error between a regression graph and input data is displayed in color. In addition, Jpn. Pat. Appln. KOKAI Publication No. H10-124690 (patent document 2) discloses that regression graphs are displayed in different display colors.

However, in each of the above patent documents 1 and 2, the display of a graph is merely effected in color, and this technique is not sufficient in order to visually compare the mutual relationship between the graph and numerical data items of list data on which the graph is based.

BRIEF SUMMARY OF THE INVENTION

Accordingly, it is an object of the present invention to provide a graph display apparatus which enables easy visual understanding of the mutual relationship between a graph and individual numerical data items of list data, on which the graph is based, in the case where the graph is drawn based on the numerical data items of the list data.

According to one aspect of the present invention, there is provided a graph display apparatus including a list input unit configured to input list data including a plurality of numerical data items, a color designation unit configured to designate arbitrary colors for the numerical data items of the list data input by the list input unit, a list storage unit configured to store the list data input by the list input unit and information of the colors designated for the numerical data items by the color designation unit in a state where the list data and the information are associated with each other, and a graph display unit configured to color-display graph data, based on the list data and the information of the colors designated for the numerical data items, which are stored in the list storage unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 shows an example of a list input screen in the electronic calculator 10;

FIG. 7 shows an example of a graph display screen at a time when "Scatter" is selected in the electronic calculator 10;

FIG. 8 shows an example of the graph display screen at a time when "Histogram" is selected in the electronic calculator 10;

FIG. 9 shows an example of a histogram, to which color change is applied, in the electronic calculator 10;

FIG. 10 shows, in comparison, states before and after a color change of the list data corresponding to the histogram in the electronic calculator 10;

FIG. 11 shows an example of a graph display screen at a time when "Regression graph" is selected in the electronic calculator 10;

FIG. 12 shows an example of a regression graph, to which a color change is applied, in the electronic calculator 10;

Figure 14:
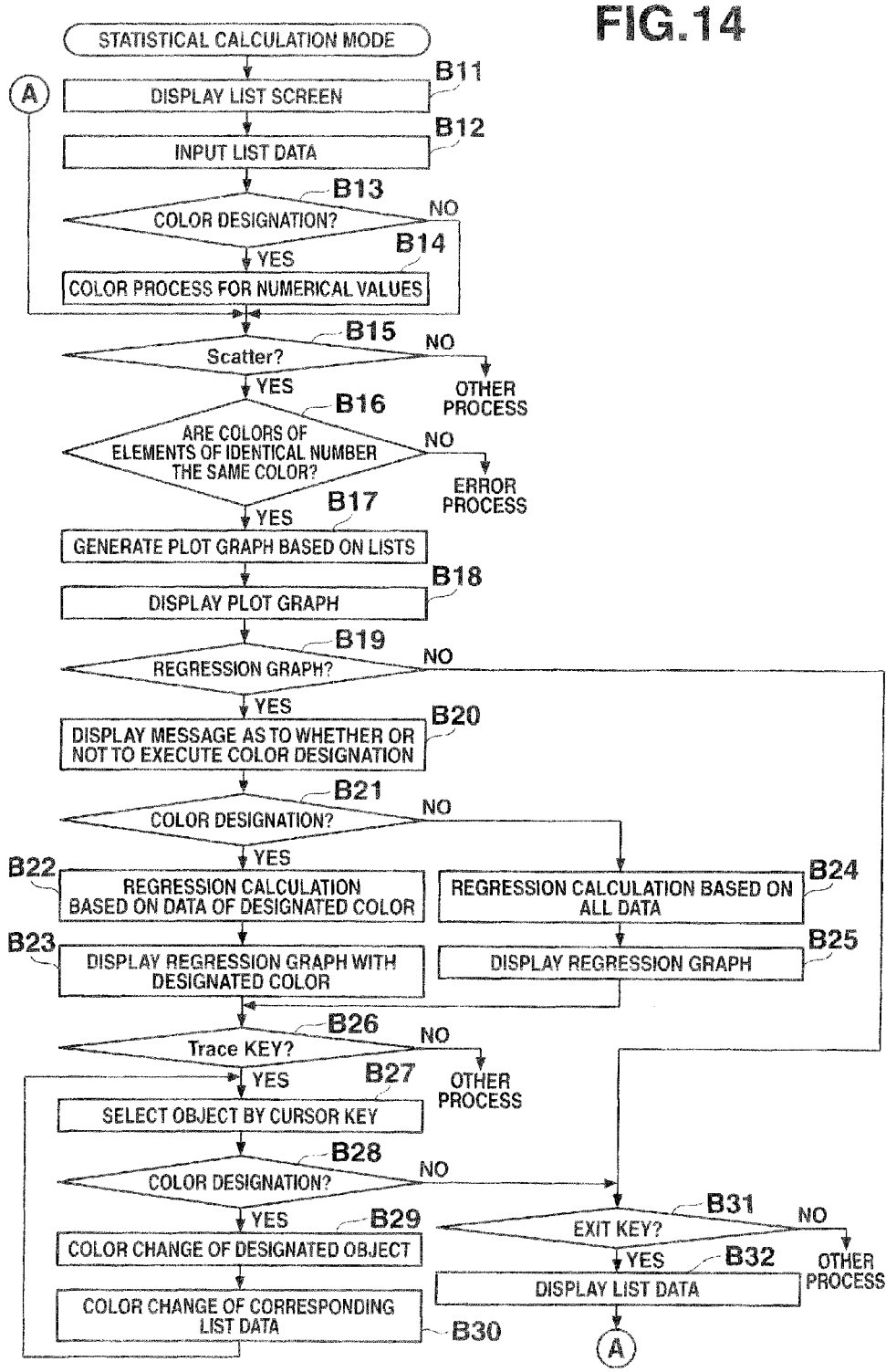
Figure 15:
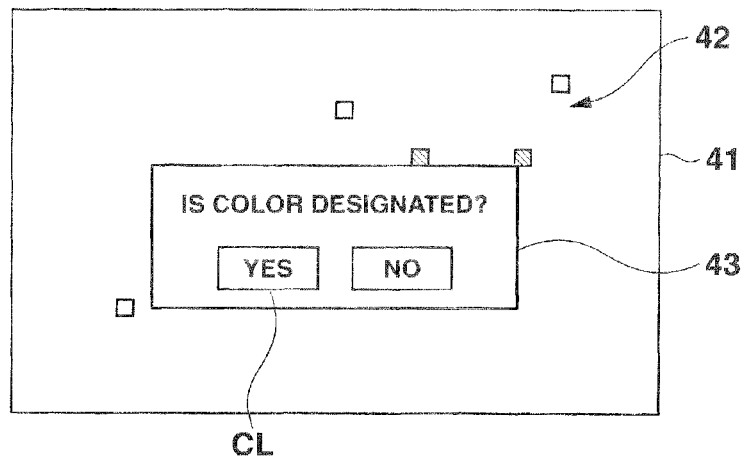
Figure 16:
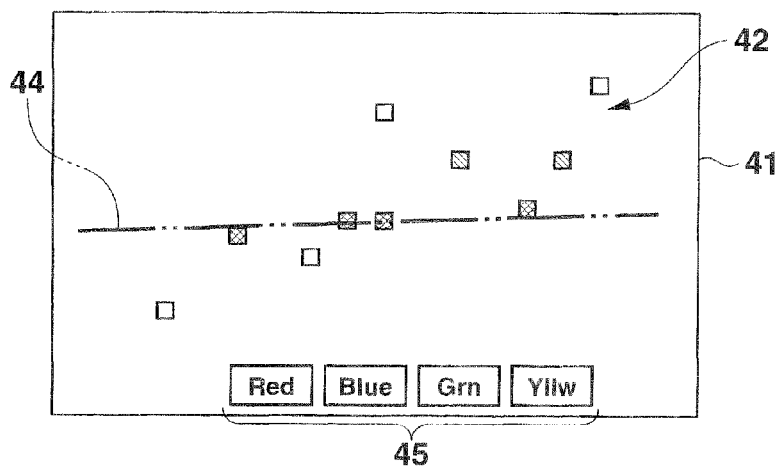
Figure 17:
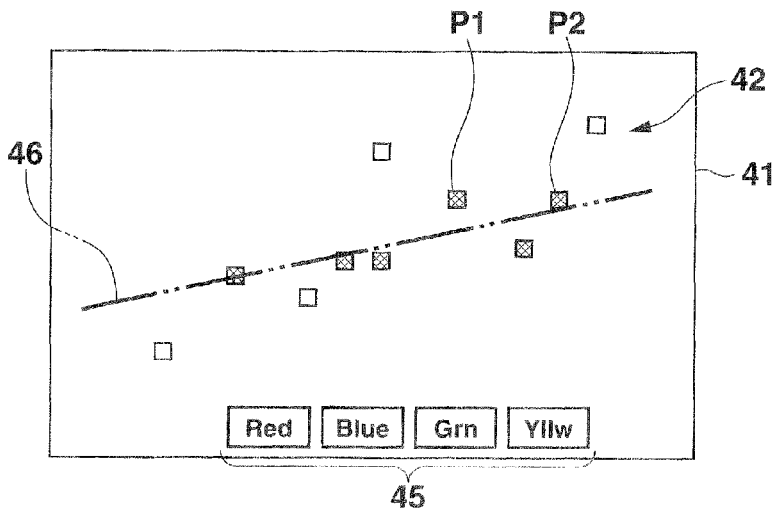
Figure 19:
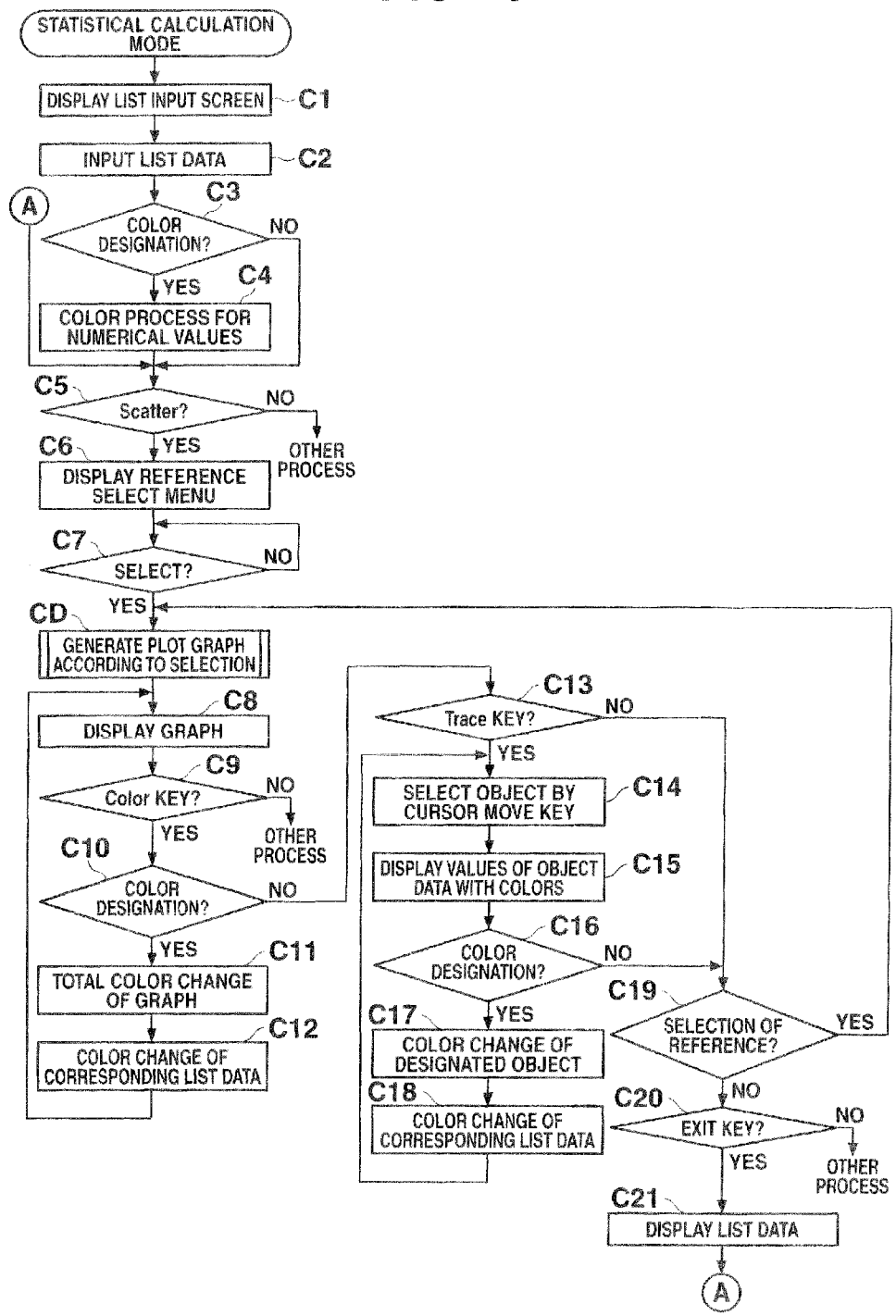
Figure 20:
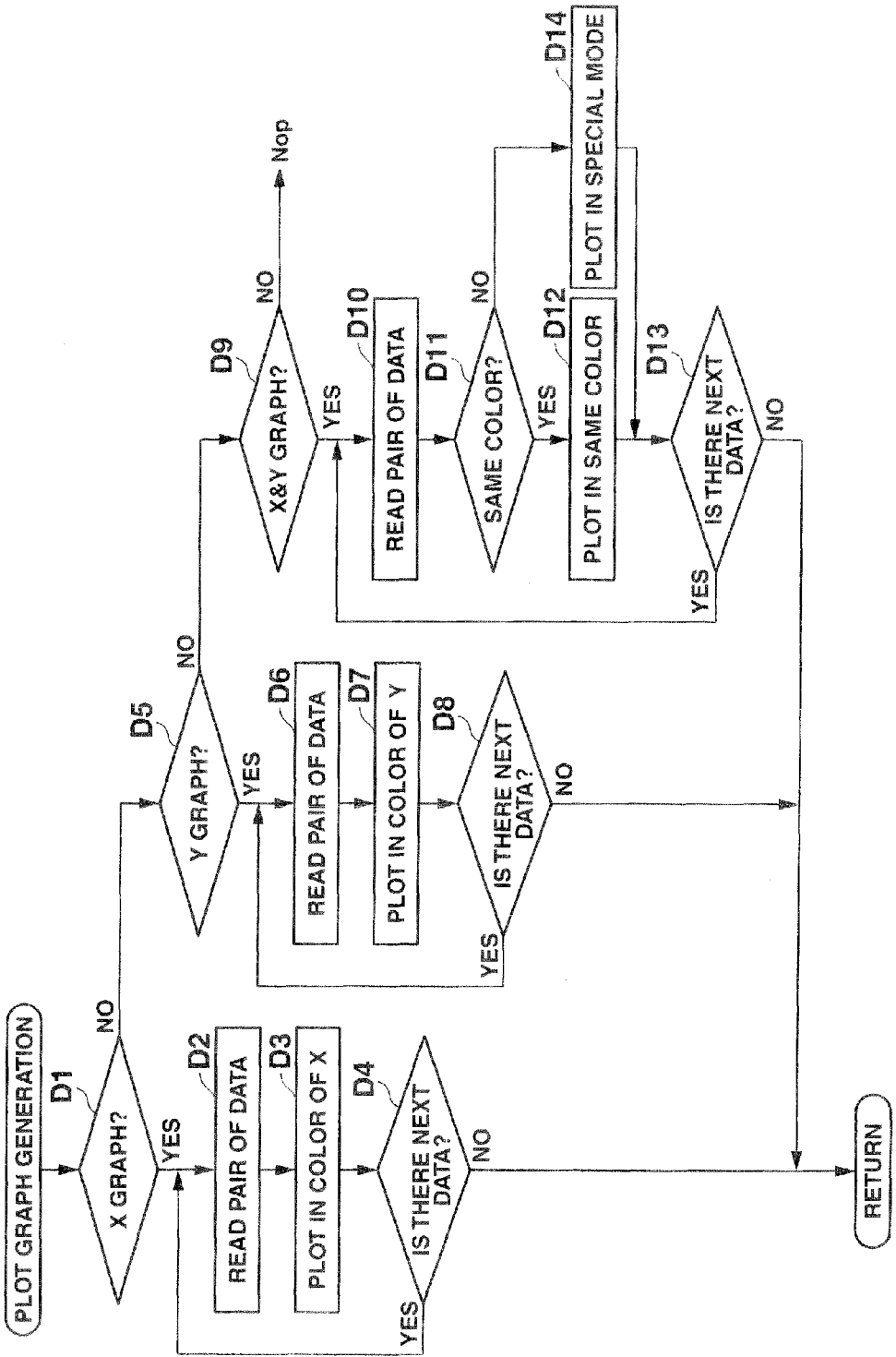

FIG, 13 shows, in comparison, states before and after a color change of the list data corresponding to the regression graph the electronic calculator 10;

FIG. 14 is a flow chart illustrating the entire flow of a graph display process at a time of a statistical calculation mode of the electronic calculator 10 according to a second embodiment of the invention;

FIGS. 15 to 17 show examples of a display screen of a plot graph in the electronic calculator 10 of the second embodiment;

FIG. 18 shows a structure example of list data which are stored in a RAM 15 provided in the electronic calculator 10 according to a third embodiment;

FIG. 19 is a flow chart illustrating the entire flow of a graph display process at a time of a statistical calculation mode of the electronic calculator 10 in the third embodiment;

FIG. 20 is a flow chart illustrating a plot graph generation process of the electronic calculator 10 in the third embodiment;

FIG. 21 shows an example of a list input screen 51 of the electronic calculator 10 in the third embodiment;

FIG. 22 shows an example of a display screen of a plot graph of the electronic calculator 10 in the third embodiment;

FIG. 23 shows an example of a display screen of a plot graph of the electronic calculator 10 in the third embodiment;

FIG. 24 shows examples of plot points in a special mode in the electronic calculator 10 according to the third embodiment; and FIG. 25 shows an example of a display screen of a plot graph in a case where a partial color change is executed in the electronic calculator 10 in the third embodiment.

DETAILED DESCRIPTION OF THE INVENTION

Embodiments of the present invention will now be described with reference to the accompanying drawings.

(First Embodiment)

Figure 1:
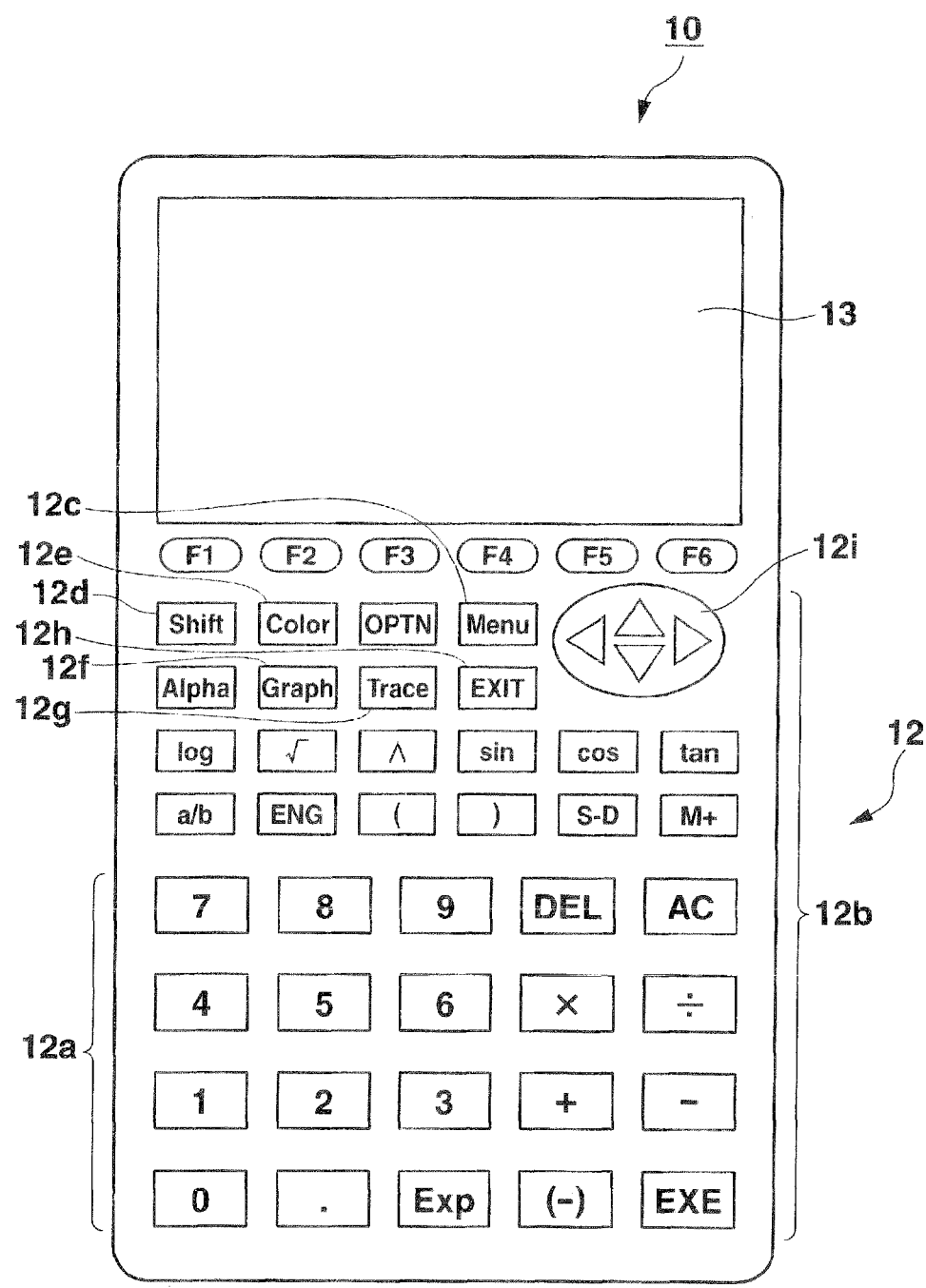
FIG. 1 is a front view showing the external structure of an electronic calculator 10 which is used as a graph display apparatus according to a first embodiment of the present invention.

FIG. 1 is a front view showing the external structure of an electronic calculator which is used as a graph display apparatus according to a first embodiment of the present invention. This electronic calculator is called "graph function electronic calculator", and has a function for drawing and displaying a graph corresponding to an input function expression or statistical data.

A key input unit 12 is provided on the main body of this electronic calculator 10 in a range of ⅔ from the lower end of the front surface of the main body, and a display unit 13 is provided in a range of ⅓ from the upper end of the front surface of the main body.

The key input unit 12 includes numeral/symbol keys 12a, function/operator keys 12b, a "MENU" key 12c, a "SHIFT" key 12d, a "Color" key 12e, a "Graph" key 12f, a "Trace" key 12g, an "EXIT" key 12h, cursor keys 12i, and function keys "F1" to "F6".

The numeral/symbol keys 12a include keys for inputting numerical values/symbols, and are configured such that keys of numerals and symbols are arranged.

The function/operator keys 12b include various function symbol keys and operator keys, such as "+", "−", "×", "÷" and "=", which are operated when an arithmetic expression or a function expression is input.

The "MENU" key 12c is operated when a select setting menu of various operation modes is to be displayed. The operation modes include an arithmetic mode in which arbitrary calculation expressions, such as four basic arithmetic operation expressions or function expressions, are input, and arithmetic processes are executed; a graph mode in which a process is executed for drawing a graph corresponding to an input function expression; a statistical calculation mode in which a statistical calculation is executed; an e-Activity mode in which a learning process of a graph function is executed; and a program mode in which an arbitrary program is input and a corresponding calculation process is executed.

The "SHIFT" key 12d is operated in combination with associated keys when various symbols or functions, which are described on upper left parts of key tops the key input unit 12, are designated and input.

The "Color" key 12e is operated when arbitrary colors are designated for input data and graphs.

The "Graph" key 12f is operated when an arbitrary graph is drawn based on input data.

The "Trace" key 12g is operated at a time of setting a trace mode for tracing a graph of a function expression displayed on the screen.

The "EXIT" key 12h is a key for exiting the present state.

The cursor keys ("↑", "↓", "←", "→") 12i are operated when an operation of selecting or scrolling displayed data is performed, or an operation of moving a cursor CL is performed.

The function keys "F1" to "F6" are operated when various select menus displayed along a lower end of the screen of the display unit 13 are selected in accordance with various operation mode.

As the display unit 13, use is made of a liquid crystal display which can effect color display in a display range of, e.g., 186 dots (vertical)×378 dots (horizontal).

Figure 2:
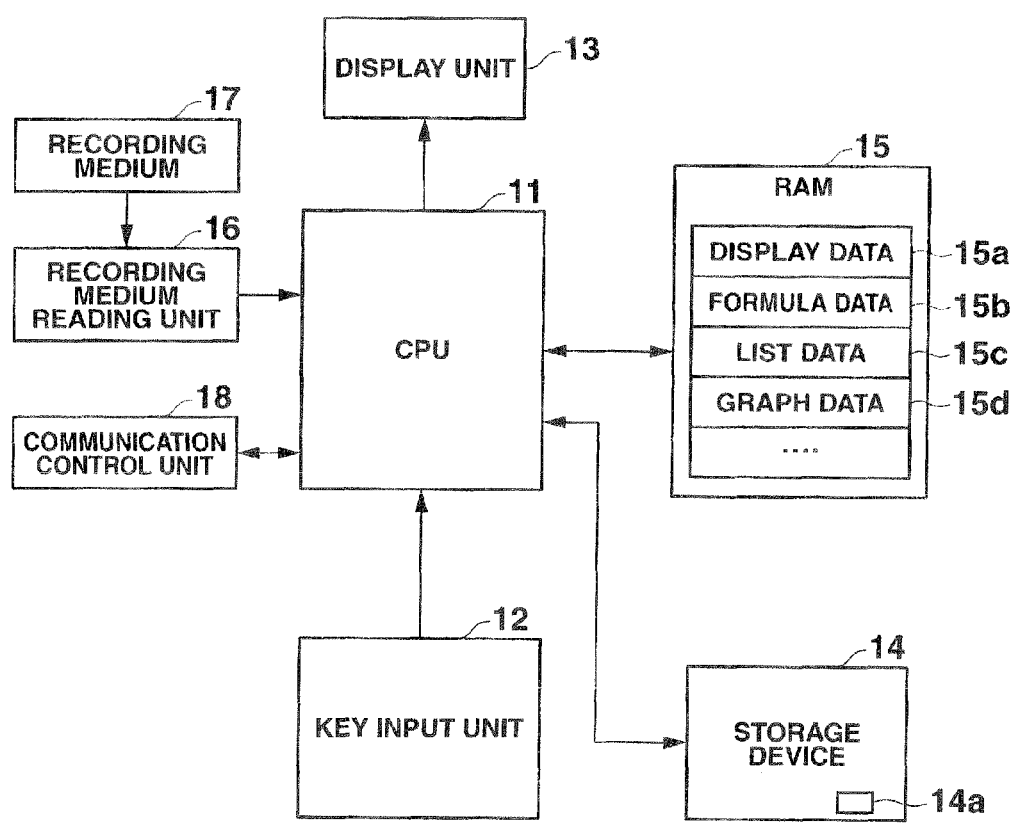
FIG. 2 is a block diagram showing the circuit structure of the electronic calculator 10.

FIG. 2 is a block diagram showing the circuit structure of the electronic calculator 10.

The electronic calculator 10 includes a CPU 11 which is a microcomputer. The CPU 11 operates circuit components by start-up of a program, and executes various functions provided in the electronic calculator 10, such as a calculator function and a function graph display function. In addition to the key input unit 12 and display unit 13 shown in FIG. 1, a storage device 14, a RAM 15, a recording medium reading unit 16 and a communication control unit 18 are connected to the CPU 11.

The storage device 14 is composed of a memory device such as a ROM. The storage device 14 stores a graph display control program 14a for realizing the present invention, and various data and programs.

The RAM 15 stores various data which are necessary for the processing operation of the CPU 11. The RAM 15 is provided with a display data storage area 15a in which data that is to be color-displayed on the screen of the display unit 13 is developed, a formula data storage area 15b, a list data storage area 15c, and a graph data storage area 15d.

The formula data storage area 15b stores data relating to function expressions which are input by the operation of the key input unit 12. The list data storage area 15c stores, together with attribute information of color designation, list data which is created by the list function of the statistical calculation mode (see FIG. 3). The graph data storage area 15d stores data relating to a graph which is created based on function expression data or list data.

The recording medium reading unit 16 reads data recorded in a recording medium 17. For example, a memory card. is used as the recording medium 17, and programs and images, for instance, are recorded in the recording medium 17.

The communication control unit 18 executes data communication with an external terminal which is connected via the universal serial bus (USB) (not shown), or data communication with an external terminal which is wirelessly connected via a predetermined communication line.

Figures 3, 4:
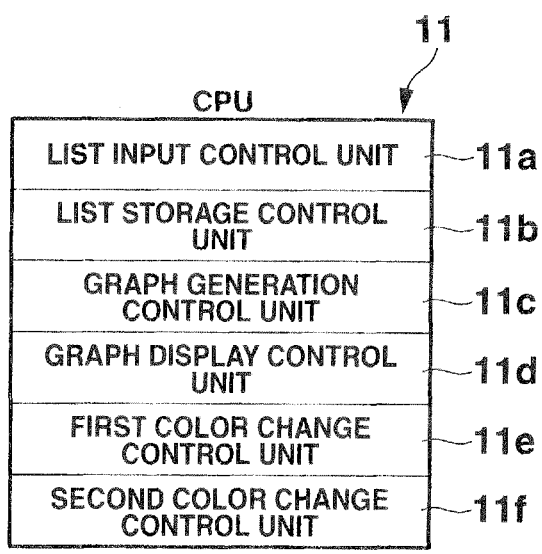
FIG. 3 shows a structure example of list data which are used in the electronic calculator 10.
FIG. 4 is a block diagram showing the functional structure of a CPU which is included in the electronic calculator 10.

FIG. 3 shows a structure example of list data which are stored in the list data storage area 15c of the RAM 15 which is provided in the electronic calculator 10.

The list data is also referred to as "statistical data" or "numerical table data". The list data includes numerical data items which are input to the cells of a list 22 provided on a list input screen 21 (to be described later). Arbitrary colors, from among a plurality of pre-prepared colors, can be designated as display colors for these numerical data items. The designated colors are associated, as attribute information, with the numerical data items, and stored in the list data storage area 15c of the RAM 15.

In the example of FIG. 3, two list data, namely "List 1" and "List 2", are shown. Data 1, 2, 3, . . . , in FIG. 3 indicate arbitrary numerical data items. In both "List 1" and "List 2", "black" is designated for data 1, 2 and 3, "red" is designated for data 4, "black" is designated for data 5, "red" is designated for data 6, and "blue" is designated for data 7.

FIG. 4 is a block diagram showing the functional structure which is realized when the CPU 11 included in the electronic calculator 10 executes the graph display control program 14a.

In the graph display, the CPU 11 functions as a list input control unit 11a, a list storage control unit 11b, a graph generation control unit 11c, a graph display control unit 11d, a first color change control unit 11e, and a second color change control unit 11f.

The list input control unit 11a executes control to display a list input screen 21 (see FIG. 6) which is to be described later,thereby inputting list data including a plurality of numerical data items by a user operation, and designating arbitrary colors for the respective numerical data items of the list data.

The list storage control unit 11b executes control to store, in the list data storage area 15c of the RAM 15, the list data that is input by the list input control unit 11a and information of the colors designated for the respective numerical data items in the state where the list data and the information are associated with each other.

The graph generation control unit 11c executes control to graph the list data which is stored in the list data storage area 15c of the RAM 15 by the list storage control unit 11b.

The graph display control unit 11d executes control to color-display the graph, which has been generated by the graph generation control unit 11c, on the screen of the display unit 13 in accordance with the colors designated for the respective numerical data items.

The first color change control unit 11e executes control to change a color of the graph displayed by the graph display control unit 11d.

The second color change control unit 11f executes control to change the color designated for numerical data items to reflect the color change by the first color change control unit 11e on the list data corresponding to the graph, which is stored in the list data storage area 15c of the RAM 15.

Next, the operation of the first embodiment is described.

Processes illustrated in flow charts below are executed when the CPU 11, which is the computer, reads the graph display control program 14a stored in the storage device 14.

Figure 5:
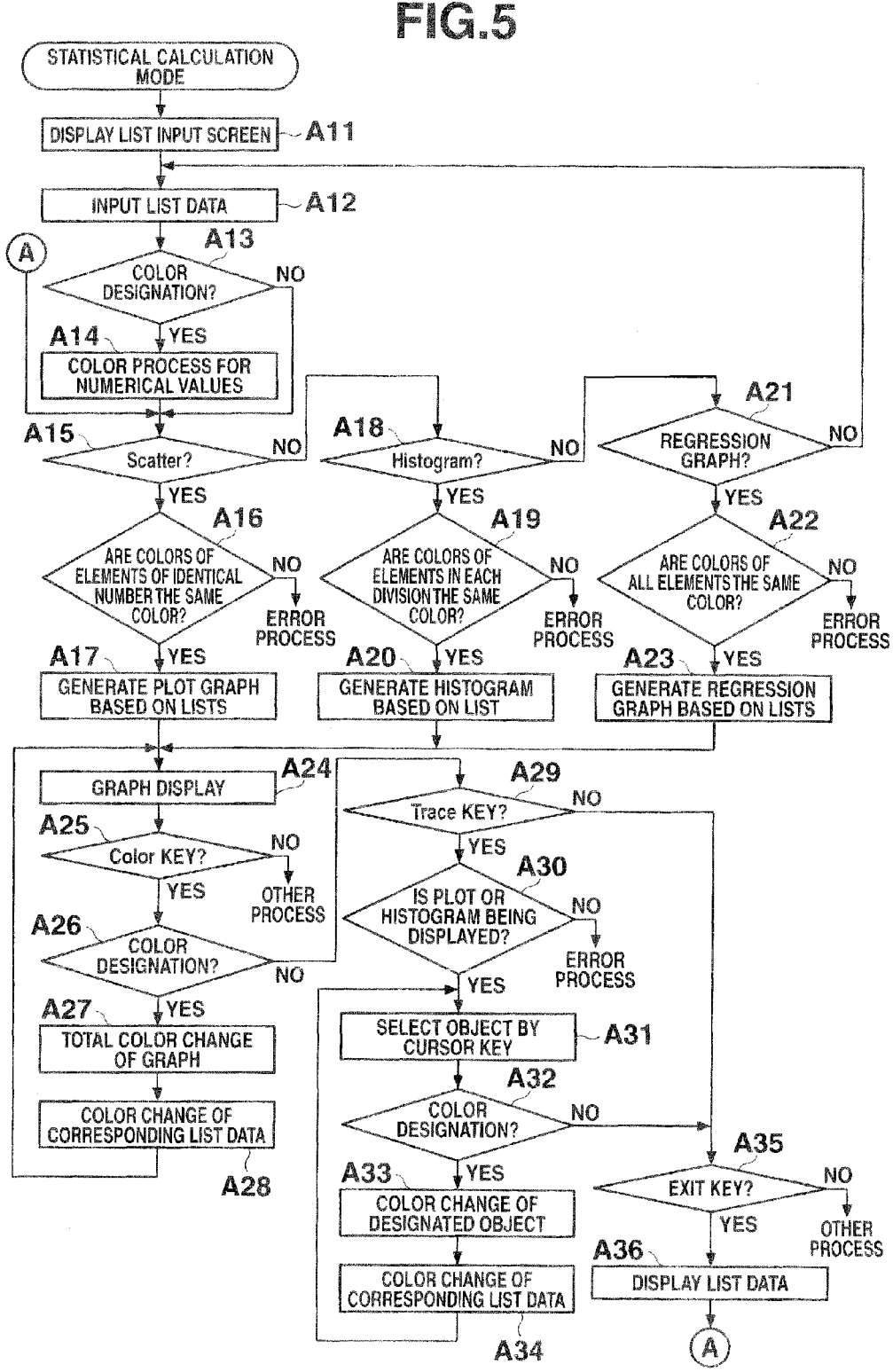
FIG. 5 is a flow chart illustrating the entire flow of a graph display process at a time of a statistical calculation mode, which is executed by the CPU included in the electronic calculator 10.

FIG. 5 is a flow chart illustrating the entire flow of a graph display process at a time of a statistical calculation mode, which is executed by the CPU 11 included in the electronic calculator 10.

(Data Input)

To start with, if the user operates the "MENU" key 12c provided on the key input unit 12 of the electronic calculator 10 and sets the statistical calculation mode, a list input screen 21 as shown in FIG. 6 is displayed on the display unit 13 under the control of the CPU 11 (step A11).

As shown in FIG. 6, the list input screen 21 is provided with a list 22 including a plurality of cells. If the user operates the numeral/symbol keys 12a of the key input unit 12 and inputs numerical data items in the respective cells of the list 22, the list data (statistical data) including these numerical data items are created (step A12).

At this time, if the "Color" key 12e provided on the key input unit 12 is operated, a select menu 23 of red (Red), blue (Blue), green (Grn) and yellow (Yllw) is displayed on a lower edge part of the list input screen 21. The user can designate arbitrary colors for the respective numerical values, by operating function keys corresponding to the respective colors of the select menu 23.

In this example, it is assumed that red is designated by operating the function key "F2", blue is designated by oper-ating the function key "F3", green is designated by operating the function key "F4", and yellow is designated by operating the function key "F5".

In the example of FIG. 6, red is designated for numerical data "10" which is put to the fourth cell of List 1, black is designated for numerical data "9" which is input to the fifth cell, red is designated for numerical data "11" which is input to the sixth cell, and blue is designated for numerical data "13" which is input to the seventh cell.

The symbols (red), (black) and (blue), which are added to the numerical data items, indicate designated colors. These symbols are added for the purpose of convenience, since depiction with colors is not possible due to the restrictions of the drawings. Actually, a numerical data item is displayed in a designated color.

In this manner, if colors are designated for the numerical data items of the list data (Yes in step A13), the designated colors are set for the associated numerical data items as attribute information, and are stored in the list data storage area 15c of the RAP 15 (step A14).

When no color is designated, black is set for associated numerical data items as a default reference color.

(Graph Display Based on List Data)

After the list data is created, if the "Graph" key 12f that is provided on the key input unit 12 is operated, a graph kind select menu (not shown), which indicates the kinds of graph, such as "Scatter", "Histogram" and "Regression graph", is displayed order along the lower end of the screen. The user selects one graph kind from the graph kind select menu by operating the function key.

The "Scatter" refers to plotting coordinate points, which are specified by X values and Y values, on XY coordinates, and a graph which is drawn by the plotted points is called "plot graph" or "scatter graph".

In the case of the "Scatter", the user performs an operation of designating two list data as X values and Y values, and designating "Scatter" from the graph kind select menu.

If this operation is performed, the process advances to a plot graph generation process (Yes in step A15). A comparison is first executed, in units of a cell number, to whether the colors of numerical data items (elements) of the two designated list data are the same color or not (step A16). If the colors of the numerical data items of both list data are the same (Yes in step A16), a plot graph, in which points of (X, Y) are successively plotted in designated colors, is generated, and the data of the plot graph are stored in the graph data storage area 15d of the RAM 15 (step A17).

At this time, if there are numerical data items with different colors between both list data (No in step A16), an error message to this effect is displayed, and the user's instruction for correction is awaited.

FIG. 7 shows an example of a graph display screen 31 at a time when "List 1" in FIG. 6 has been designated as X values and "List 2" has been designated as Y values and when "Scatter" has been selected. The graph display screen 31 displays a plot graph 32 in which a point of (10, 1.1) is plotted in red, a point of (9, 0.8) is plotted in black, a point of (11, 1.1) is plotted in red, and a point of (13, 1.5) is plotted in blue.

On the other hand, in the case of "Histogram", the user performs an operation of designating one list data and designating "Histogram" from the graph kind select menu. In the meantime, it is assumed that the range of numerical values indicating divisions of the histogram is preset by other operations.

If the above operation is performed (Yes in step A18), it is determined whether the same color is designated for the numerical data items (elements) included in each division (step A19). If the colors of the numerical data items in each division are the same (Yes in step A19), a histogram in which the respective divisions are displayed in designated colors is generated, and is stored in the graph data storage area 15d of the RAM 15 (step A20).

At this time, if there is a division in which the colors of the numerical data items are not the same (No in step A19), an error message to this effect is displayed, and the user's instruction for correction is awaited. In the case where the designated list data include no numerical data items for which the color is designated, a histogram is generated with the default black color.

FIG. 8 shows an example of a graph display screen 33 at a time when "Histogram" is selected.

A histogram 34 includes bar graphs 35a, 35b, 35c, . . . , which are indicative of the numbers of numerical data items in the respective divisions. The numbers of numerical data items in the respective divisions can be compared from the heights of the bar graphs 35a, 35b, 35c, . . . .

The example of FIG. 8 corresponds to a List 1 shown in part (a) of FIG. 10. Since the colors of the respective numerical data items are all black, the bar graphs 35a, 35b, 35c, . . . , which constitute the histogram 34, are also displayed in black. If colors, other than black, are designated for the respective numerical data items, the bar graphs 35a, 35b, 35c, . . . , are displayed in the designated colors.

In the case of the "Regression graph", the user performs an operation of designating two list data as X values and Y values, and designating the "Regression graph" from the graph kind select menu. If the "Regression graph" is designated, a menu is displayed for selecting, as the kind of regression, one of "Linear regression", "Quadratic regression" and "Cubic regression". If the user selects a desired one of these, a corresponding regression graph is drawn.

If the drawing of a regression graph is instructed (Yes in step A21), it is determined whether the same color is designated for all numerical data items (elements) of the two list data (step A22). If the colors of all numerical data items are the same (Yes in step A22), a regression calculation corresponding to the set regression kind is executed, a regression graph is generated according to the calculation result, and the generated regression graph is stored in the graph data storage area 15d of the RAM 15 (step A23).

At this time, if there are numerical data items with different colors between the two list data (No in step A22), an error message to this effect is displayed, and the user's instruction for correction is awaited.

FIG. 11 shows an example of a graph display screen 37 at a time when "Regression graph" has been designated.

For example, "List 1" is designated as X values and "List 2" is designated as Y values and a linear regression is set. Thereby, a regression graph 38 is drawn.

The example of FIG. 11 corresponds to a List 1 and a List 2 shown in part (a) of FIG. 13. Since the colors of all numerical data items are black, a straight line of the regression graph 38 is displayed in black. If a color, other than black, is designated for the respective numerical data items, the straight line of the regression graph 38 is displayed in the designated color.

(Color Change After Graph Display)

In this manner, if the graph data corresponding to the graph kind selected by the user are stored in the graph data storage area 15d of the RAM 15, the graph data are developed in the display data storage area 15a of the RAM 15 and are displayed on the screen of the display unit (step A24). At this time, the graph is displayed with the color designated for the respective numerical data items of the list data, on which the graph is based.

Total Color Change

If the "Color" key 12e, which is provided on the key input unit 12, is operated by the user after the display of the graph (Yes in step A25), the select menu 23 of red (Red), blue (Blue), green (Grn) and yellow (Yllw) is displayed on the lower side of the graph display screen.

If one of the colors of the select menu 23 is designated by operating the function key (Yes in step A26), the color of the entire graph is changed to the designated color (step A27).

Accordingly, the color designated for numerical data items of the list data stored in the list data storage area 15c of the RAM 15 is similarly changed (step A28).

For example, if the "Color" key 12e is operated in the state in which the regression graph 38, as shown in FIG. 11, is displayed, the select menu 23 is displayed on the lower side of the screen. If the blue (Blue) in the select menu 23 is designated by operating the function key, the straight line of the regression graph 38 is changed from black to blue.

FIG. 12 shows a regression graph 38 after color change. A dot-and-dash line represents the change of color to blue, for the purpose of convenience. At this time, as shown in part (b) of FIG. 13, the color designated for the respective numerical data items of the list data corresponding to the regression graph 38 is also changed to blue.

The same applies to the plot graph 32 shown in FIG. 7 and the histogram 34 shown in FIG. 8. The color of these graphs is changed to the color designated in the select menu 23, this color change is reflected on all numerical data items of the list data that is the object, and the color of all numerical data items is similarly changed.

Partial Color Change

On the other hand, after the "Color" key 12e is operated (Yes in step A25), if the "Trace" key 12g, instead of the function key, is operated (step A29), the select menu 23 of red (Red), blue (Blue), green (Grn) and yellow (Yllw) is displayed on the lower side of the graph display screen, and a partial color change is executed in the following procedure.

Since the electronic calculator 10 is not provided with a touch panel, it is assumed that a trace mode is set by operating the "Trace" key 12g, and objects (e.g., points on the graph), which are being displayed, are success'ely designated one by one by the operation of the cursor key 12i.

If the "Trace" key 12g is operated, the kind of the graph, which is currently being displayed, is determined (step A30). If the kind of the graph, which is currently being displayed, is neither the plot graph nor the histogram, that is, if the kind of the graph is the regression graph (No in step A30), a partial color change is not possible, and an error message to this effect is displayed.

If the kind of the graph, which is currently being displayed, is either the plot graph or the histogram (Yes in step A30), the object (a point on the plot graph or a bar graph of the histogram), which is selected by the operation of the cursor key 12i, is extracted as an object of color change (step A31).

Then, when one of the colors of the select menu 23 has been designated by the operation of the function key (Yes in step A32), the color of the extracted object is changed to the designated color (step A33). Accordingly, the color of the corresponding data item in the numerical data items of the list data, which are stored in the list data storage area 15c of the RAM 15, is changed (step A34).

For example, if the "Color" key 12e is operated on the graph display screen 33 of the "Histogram" shown in FIG. 8, the select menu 23 is displayed on the lower side of the screen. At this time, all bar graphs 35a, 35b, 35c, . . . , which constitute the histogram 34, are displayed in black.

If the bar graph 35a is selected as a color-change target (object), and red (Red) in the select menu 23 is designated, the color of the bar graph 35a alone is changed from black to red.

FIG. 9 shows an example of the histogram 34 after the partial color change. FIG. 9, the hatched part of the bar graph 35a of the histogram 34 represents the change of the color to red, for the purpose of convenience. At this time, as shown in parts (a) and (b) of FIG. 10, the color designated for numerical data items of the list data corresponding to the bar graph 35a of the histogram 34 is also changed from black to red.

Subsequently, in the similar manner, the objects are designated one by one by the operation of the cursor key 12i, and the color of the designated object can be partly changed.

If the "EXIT" key 12h, which is provided on the key input unit 12, is operated (Yes in step A35), the process exits the graph display state, and the list data corresponding to the graph are read out from the list data storage area 15c of the RAM 15 and are displayed on the screen (step A36). At this time, if the color change of the graph has been made, the color of the displayed list data is also the changed color.

As has been described above, according to the electronic calculator 10 of the present embodiment, when the user inputs list data, the user designates arbitrary colors for numerical data items of the list data. Thereby, the graph is color-displayed in accordance with the designated colors. Accordingly, the mutual relationship between the list data and the graph can visually be understood by color, and the characteristics of the graph, which is drawn based on the list data, can be understood.

Moreover, if the user executes a total color change or a partial color change on the graph that is being displayed, the color change is reflected on the numerical data items of the list data. Thus, the mutual relationship between the graph, which is being displayed, and the numerical data items of the list data can easily be learnt from the color change.

In addition, since the graph corresponding to "Scatter", "Histogram" or "Regression graph", as a kind of graph, can arbitrarily and selectively be color-displayed, the mutual relationship between the characteristics of the graph and the numerical data items of the list data can easily be learnt from the color change.

(Second Embodiment)

Next, a second embodiment of the present invention is described.

In the second embodiment, after points are plotted in different colors, a regression graph is drawn by designating an arbitrary one of these colors.

The basic apparatus structure of the second embodiment is the same as that of the first embodiment. Thus, the processing operation is described below.

FIG. 14 is a flow chart illustrating the entire flow of a graph display process at a time of a statistical calculation mode, which is executed by the CPU 11 included in the electronic calculator 10 according to the second embodiment of the invention. In FIG. 14, since the process of steps B11 to B18 is the same as the process of steps A11 to A17 and step A24, a detailed description of this process is omitted.

Assume now that a plot graph has been displayed on the screen of the display unit 13 in colors designated by the user on the basis of the list data. FIG. 15 shows an example of a graph display screen 41 at this time. A plot graph 42, in which respective points are plotted in designated colors, is drawn on the graph display screen 41.

If the "Regression graph" is designated by the user's predetermined operation after the plot graph is displayed (Yes in step B19), a confirmation message 43 as to whether or not to designate a color is displayed, as shown in FIG. 15 (step B20).

If the user selects "Designate color" by the operation of the cursor key 12i (Yes in step B21), a select menu 45 of red (Red), blue (Blue), green (Grn) and yellow (Yllw) is displayed on the lower side of the graph display screen 41. The colors in the select menu 45 are designated by the operation of the function keys.

If one of the colors of the select menu 45 is designated (Yes in step B21), numerical data items having the designated color are extracted from the list data corresponding to the plot graph, which are stored in the list data storage area 15c of the RAM 15, and a regression calculation is executed based on the extracted numerical data items (step B22). Then, a regression graph is drawn with the designated color according to the calculation result (step B23).

On the other hand, if the user selects "Not designate color" (No in step B21), a regression calculation is executed based on all numerical data items of the list data corresponding to the plot graph (step B24). Then, a regression graph is drawn in black, or the reference color, according to the calculation result (step B25).

FIG. 16 shows an example of a regression graph 44 in the case where the color is designated. In this example, the regression graph 44, which based on red points in the plot graph is displayed. A two-dot-and-dash line of the regression graph 44 represents the display in red, for the purpose of convenience.

Subsequently, if the "Trace" key 12g is operated (Yes in step B26), the electronic calculator 10 transitions to a trace mode, and the user is enabled to select one of displayed objects. One object (a point on the graph), which is selected by the operation of the cursor key 12i, becomes an object of color change (step B27).

Then, when one of the colors of the select menu 45 is designated by the operation of the function key (Yes in step B28), the color of the selected object is changed to the designated color (step B29). Accordingly, the color of the corresponding data in the list data, which are stored in the list data storage area 15c of the RAM 15, is similarly changed (step B30). In this case, two sets of list data, which are the basis of the plot graph displayed in step B18, become objects of color change, and the color of the corresponding data item in the numerical data items of the two sets of list data is changed to the designated color.

Subsequently, in the similar manner, while the objects are designated one by one by the operation of the cursor key 12i, the color of the selected object can be changed.

If the "EXIT" key 12h, which is provided on the key input unit 12, operated (Yes in step B31), the process exits the graph display state, and the list data corresponding to the graph are read out from the list data storage area 15c of the RAM 15 and are displayed on the screen (step B32). At this time, if the color change of the graph has been made, the color of the displayed list data is also the changed color.

As has been described above, in the case where the plot graph is displayed based on the numerical data items of the list data, an arbitrary color may be designated, and a regression graph can be drawn based on only the objects of the designated color.

Furthermore, if the color of object points is changed by operating the "Trace" key 12g, it is possible to re-draw a regression graph based on the color-changed object points, after once restoring the list display by the "EXIT" key 12h. Thereby, for example, such a mode of use is possible that the color of a point (abnormal point) which is to be eliminated by a regression calculation, or a point which is to be added by a regression calculation, is color-changed, and the regression graph is rewritten. FIG. 17 shows an example in which the color of points P1 and P2 is changed (from blue to and thereby a regression calculation of points including points P1 and P2 is executed and a regression graph 46 is re-drawn.

In each of the above-described embodiments, red (Red), blue (Blue), green (Grn) and yellow (Yllw) can be designated as colors other than black, and five colors in total can be used for display. However, colors other than these colors may be designated, and such a configuration may be adopted that more than five colors can be designated.

Besides, the plot graph, histogram and regression graph have been described as examples of the graph kinds. However, the present invention is similarly applicable to the case of drawing other graphs.

(Third Embodiment)

A third embodiment of the present invention will now be described with reference to the accompanying drawings.

In the third embodiment, when a plot graph is displayed, the user is enabled to designate whether the display colors of plot points are displayed in accordance with either of two list data, or both of the two list data.

The basic apparatus structure of the third embodiment is the same as that of the first embodiment. Thus, the processing operation is described below.

FIG. 18 shows structures of list data which are stored in the list data storage area 15c of the RAM 15 provided in the electronic calculator 10. FIG. 18 shows two list data, namely "List 1" and "List 2".

When the list data stored in the list data storage area 15c are to be graphed as a plot graph, the graph generation control unit 11c, which is made to function by the CPU 11 of the electronic calculator 10, plots the points of (X, Y) by using numerical data items of the List 1 as "X" and numerical data items of the List 2 as "Y", thereby graphing these points. At this time, if the user selects an "X" graph as the reference of the display colors of plot points, the plot points are displayed in the colors designated for the respective numerical data items of the List 1, and if the user selects a "Y" graph, the plot points are displayed in the colors designated for the respective numerical data items of the List 2. Furthermore, in the case where the user selects an "X&Y" graph, if the numerical data items in the List 1 and List 2 have the same color, the plot points are displayed in this same color. If the numerical data items in the List 1 and List 2 have different colors, the plot points are displayed in a special mode (see FIG. 24).

Besides, when the colors of the plot graph, which have been changed by the first color change control unit 11e, are reflected on the list data stored in the list data storage area 15c of the RAM 15, the second color change control unit 11f, which is made to function by the CPU 11 of the electronic calculator 10, changes the colors of all numerical data items of the List 1 if the "X" graph is selected as the reference of the display colors, and changes the colors of all numerical data items of the List 2 if the "Y" graph is selected as the reference of the display colors. Moreover, if the "X&Y" graph s selected, the second color change control unit 11f executes control to change the colors of all numerical data items of the List 1 and List 2.

Next, the operation of the electronic calculator 10 having the above structure is described.

Processes illustrated in flow charts below are executed when the CPU 11, which is the computer, reads the graph display control program 14a stored in the storage device 14.

FIG. 19 is a flow chart illustrating the entire flow of a graph display process at a time of a statistical calculation mode, which is executed by the CPU 11 included in the electronic calculator 10.

FIG. 20 is a flow chart illustrating a plot graph generation process which is involved in the graph display process at the time of the statistical calculation mode in the electronic calculator 10.

(Data Input)

FIG. 21 shows an example of a list input screen 51 at the time of the statistical calculation mode in the electronic calculator 10.

To start with, if the user operates the "MENU" key 12c provided on the key input unit 12 of the electronic calculator 10 and sets the statistical calculation mode, a list input screen 51 as shown in FIG. 21 is displayed on the display unit 13 under the control of the CPU 11 (step C1).

As shown in FIG. 21, the list input screen 51 is provided with a list 52 including a plurality of cells. If the user operates the numeral/symbol keys 12a of the key input unit 12 and inputs numerical data items in the respective cells of the list 52, the list data (statistical data) including these numerical data items are created (step C2).

At this time, if the "Color" key 12e provided on the key input unit 12 is operated, a color select menu 53 of red (Red), blue (Blue), green (Grn) and yellow (Yllw) is displayed on a lower edge part of the list input screen 51. The user can designate arbitrary colors for the respective numerical values, by operating function keys "Fn" corresponding to the respective colors of the select menu 53.

In this example, it is assumed that red is designated by operating the function key "F2", blue is designated by operating the function key "F3", green is designated by operating the function key "F4", and yellow is designated by operating the function key "F5".

In the example of FIG. 21 and FIG. 18, data relating to the body height of persons belong to a certain group are input to "List 1". Data with "150" or more are colored in blue, and data with "100" or less are colored in red. Data relating to the body weight of persons described in "List 1" are input to "List 2". Data with "60" or more are colored in red, and data with "40" or less are colored in blue.

Accordingly, blue is designated for numerical data "156" which is input to the fourth cell of the List 1, and red is designated for numerical data "96" which is input to the seventh cell. Red is designated for numerical data "60" which is input to the fourth cell of the List 2, blue is designated for numerical data "40" which is input to the seventh cell of the List 2, and red is designated for numerical data "62" which is input to the eighth cell of the List 2.

The designated colors, which are described with leader lines added. to the numerical data items in FIG. 21, are added for the purpose of convenience, since depiction with coloring is riot possible due to the restrictions of the drawings. Actually, the numerical data items are color-displayed in designated colors.

In this manner, if colors are designated for the numerical data items of the list data (Yes in step C3), the designated colors are stored as attribute information in the list data storage area 15c of the RAM 15 (step C4).

When no color is designated, black is set for associated numerical data items as a reference color.

(Graph Display Based on List Data)

After the list data is created, if the "Graph" key 12f that is provided on the key input unit 12 is operated, a graph kind select menu (not shown), which indicates the kinds of graph, such as "Scatter", "Histogram" and "Regression graph", displayed in order along the lower end of the screen. The user can select an arbitrary graph kind by operating the function key "Fn".

In the case of the "Scatter", the user performs an operation of designating two list data as X values and Y values, and designating "Scatter" from the graph kind select menu.

If the "Scatter" is designated (Yes in step C5), a reference select menu 54 for prompting the user to select "X", "Y" or "X&Y" as the reference of display colors of plot points is displayed on the lower end of a graph display screen 61 (step C6).

If a select operation is executed by the user on the reference select menu 54 (Yes in step C7), the process advances to a plot graph generation process illustrated in FIG. 20, and a plot graph is generated (step CD).

The plot graph generation process is described with reference to FIG. 20.

If "X" is selected on the reference select menu 54 (Yes in step D1), a pair of numerical data items are taken in from first data of the List 1 and List 2 which are to be graphed and are stored in the list data storage area 15c (step D2). Data, in which points of (X, Y) corresponding to the pair of numerical data items are plotted in the color designated for numerical data items of the "X" (List 1), are generated and stored in the graph data storage area 15d of the RAM 15 (step D3). Similarly, until all numerical data items are taken in, numerical data items are successively taken in from the List 1 and List 2, and plot data, in which points of (X, Y) corresponding to the taken-in numerical data items are plotted in the colors designated for the numerical data items of the "X", are generated and stored in the graph data storage area 15d of the RAM 15 (steps D2 to D4).

Specifically, as shown in the graph display screen 61 of FIG. 22, a plot graph 62X, in which plot points 63a to 63j including numerical data items of the List 1 as "X" and numerical data items of the List 2 as "Y" are drawn, is color-displayed in reference colors which correspond to the colors designated for the numerical data items of the List 1. To be more specific, the plot point (156, 60) 63d corresponding to the fourth cell is displayed in blue, the plot point (96, 40) 63g corresponding to the seventh cell is displayed in red, and the other plot points are displayed in black.

On the other hand, if "Y" is selected on the reference select menu 54 (Yes in step D5), numerical data items are successively taken in from the List and List 2 in the same manner as described above, and plot data, in which points of (X, Y) are successively plotted in the colors designated for the numerical data items of the "Y" (List 2), are generated and stored in the graph data storage area 15d of the RAM 15 (steps D6 to D8).

Specifically, as shown in the graph display screen 61 of FIG. 23, a plot graph 62Y, in which plot points 63a to 63j including numerical data items of the List 1 as "X" and numerical data items of the List 2 as "Y" are drawn, is color-displayed in reference colors which correspond to the colors designated for the numerical data items of the List 2. To be more specific, the plot point (156, 60) 63d corresponding to the fourth cell is displayed in red, the plot point (96, 40) 63g corresponding to the seventh cell is displayed in blue, the plot point (122, 62) 63h corresponding to the eighth cell is displayed in red, and the other plot points are displayed in black.

On the other hand, if "X&Y" is selected on the reference select menu 54 (Yes in step D9), numerical data items are successively taken in from the List 1 and List 2 in the same manner as described above (step D10). Then, it is determined whether the color designated for the read-out numerical data items of the List 1 and the color designated for the read-out numerical data items of the List 2 are the same color or not (step D11).

If it is determined that the colors are the same color (Yes in step D11), plot data in which points of (X, Y) are plotted in this same color are generated, and the plot data are stored in the graph data storage area 15d of the RAM 15 (steps D10 to D13).

On the other hand, if it is determined that the color designated for the read-out numerical data items of the List 1 and the color designated for the read-out numerical data items of the List 2 are different (No in step D11), plot data in which points of (X, Y) are plotted in a special mode are generated. The generated plot data are stored in the RAM 15 (steps D10, D11 (No), D14 and D13).

In the case of the data of FIG. 18, plot points 63d, 63g and 63h corresponding to the fourth, seventh and eighth cells are displayed in a special mode.

For example, a plot point in the special mode may be displayed frame-shaped plot point 63A in which a hole is opened at the center thereof, as shown in part (a) of FIG. 24, or may be displayed as a frame-shaped plot point 63B which is divided in halves in two different colors by using the colors of the List 1 and List 2, as shown in part (b) of FIG. 24.

If the above-described plot graph generation process is finished (Return), the plot graph stored in the graph data storage area 15d is developed in the display data storage area 15a, and is color-displayed on the screen of the display unit 13 as the graph display screen 61 as shown in FIG. 22 or FIG. 23 (step C8).

(Color Change after Graph Display)

Total Color Change

If the "Color" key 12e, which is provided on the key input unit 12, is operated by the user after the display of the plot graph (Yes in step C9), a color select window (not shown) of red (Red), blue (Blue), green (Grn) and yellow (Yllw) is displayed on the graph display screen 61.

If one of the colors in the color select window is designated by operating the cursor key 12i (Yes in step C10), the color of the entire graph is changed to the designated color (step C11). Accordingly, the color designated for numerical data items of the list data stored in the list data storage area 15c of the RAM 15 is similarly changed (step C12).

At this time, in the plot graph generation process (see FIG. 20), if the "X" of the reference select menu 54 is selected, the colors of all numerical data items of the List 1 are changed to the fixed color designated on the color select window. If the "Y" of the reference select menu 54 is selected, the colors of all numerical data items of the List 2 are changed to the color designated on the color select window. Further, if the "X&Y" of the reference select menu 54 is selected, the colors of all numerical data items of the List 1 and List 2 are changed to the fixed color designated on the color select window.

For example, if the "Color" key 12e is operated in the state in which the plot graph 62X at the time when the "X" is selected for the reference of the display color, as shown in FIG. 22, is displayed, and if blue (Blue) in the color select window is designated, the colors of all plot points 63a to 63j which constitute the plot graph 62X are changed to blue. Then, the colors of all numerical data items of the List 1 are changed to blue.

Besides, for example, if the "Color" key 12e is operated in the state in which the plot graph 62Y at the time when the "Y" is selected for the reference of the display color, as shown in FIG. 23, is displayed, and if red (Red) in the color select window is designated, the colors of all plot points 63a to 63j which constitute the plot graph 62Y are changed to red. Then, the colors of all numerical data items of the List 2 are changed to red.

Partial Color Change

On the other hand, after the "Color" key lb is operated (Yes in step C9) and the color select window (not shown) of red (Red), blue (Blue), green (Con) and yellow (Yllw) is displayed on the graph display reen 61, if the "Trace" key 12g, instead of the function key "Fn", is operated (step C13), a partial color change is executed in the following procedure.

Since the electronic calculator 10 is not provided with a touch panel, it is assumed that when switching to a trace mode is effected by operating the "Trace" key 12g, an operation is executed to designate objects (e.g., points on the graph), which are being displayed, one by one by the operation of the cursor key 12i.

FIG. 25 shows the display screen 61 of the plot graph 62X in a case where partial color change is executed by the "Trace" key 12g in the graph display process at the time of the statistical calculation mode in the electronic calculator 10.

If the "Trace" key 12g is operated and the trace mode is set (Yes in step C13), one plot point 63g on the plot graph 62X is selected by the operation of the cursor key 12i, for example, as shown in FIG. 25, and is displayed for identification by flickering or the like (step C14).

At this time, numerical data [X=96] [Y=40] corresponding to the selected plot point 63g are read out from the List 1 and List 2 (see FIG. 18), and these numerical data items are displayed in red and blue which are designated for the numerical data items (step C15).

Then, when one of the colors of the color select window (not shown) has been designated by the operation of the cursor key 121 (Yes in step C16), the color of the extracted plot point 63g is changed to the designated color (step C17). Accordingly, the color of the data stored in the list data storage area 15c of the RAM 15 is changed (step C18).

At this time, in the plot graph generation process (see FIG. 20), if the "X" of the reference select menu 54 is selected, only the color of the numerical data items of the List 1, which corresponds to the selected plot point, is changed to the designated color. If the "Y" of the reference select menu 54 is selected, only the color of the numerical data items of the List 2 is changed to the designated color. Further, if the "X&Y" of the reference select menu 54 is selected, the colors of the numerical data items of the List 1 and List 2, which correspond to the selected plot point, are changed to the designated color.

Specifically, in the graph display screen 61 of the plot graph 62X shown in FIG. 25, in which the "X" is selected for the reference of the display color, if the plot point tip, which is currently displayed in red, is selected as a color change target (object), and blue (Blue) in the color select window is designated (Yes in step C16), the color of the plot point 63g is changed from red to blue (step C17).

Then, only the color of the numerical data [X=96] of the respective numerical data [X=96] and [Y=40] of the List 1 and List 2, which correspond to the plot point 63g, is changed from red to blue (step C18).

Subsequently, in the similar manner, while the objects (plot points) are designated one by one by the operation of the cursor key 12i, the color of the designated object can be partly changed.

On the other hand, while the plot graph is being displayed, if another reference is selected in the reference select menu 54 which is displayed air all times on the lower end part of the display screen 61 (Yes in step C19), the plot graph generation process illustrated in FIG. 20 is re-executed according to the selected other reference (step CD). Thus, the reference of the color for color display can switched at any time, for example, in such a manner that the color display of the plot graph, which is color-displayed by the "X" reference, is changed to the color display by the "Y" reference or "X&Y" reference.

If the "EXIT" key 12h, which is provided on the input unit 12, is operated (Yes in step C20), the process exits the graph display state, and the list data corresponding to the graph are read out from the list data storage area 15c of the RAM 15 and are displayed on the screen (step C21). At this time, if the color change of the graph has been made, the color of the displayed list data is also the changed color.

Thus, according to the graph display function at the statistical calculation mode in the electronic calculator 10 having the above-described structure, when the user inputs list data, the user designates arbitrary colors for the respective numerical data items of the list data. Thereby, a plot graph according to the designated colors is color-displayed. At this time, if the "X" is selected in the reference select menu 54, the respective plot points are color-displayed, based on, as reference colors, the colors designated for the numerical data items of the List 1. If the "Y" is selected in the reference select menu 54, the respective plot points are color-displayed, based on, as reference colors, the colors designated for the numerical data items of the List 2. Further, if the "X&Y" is selected, a plot point, at which the colors designated for the corresponding numerical data items of the List 1 and List 2 are the same color, is displayed in this same color. A plot point, at which the colors designated for the corresponding numerical data items of the List 1 and List 2 are different, is displayed in the special mode, like the frame-shaped plot point (63A or 63B). Therefore, the mutual relationship between the list data and the plot graph can risaally be understood based on colors or display mode, and the characteristics of the plot graph, which is drawn basedd on the list data, can easily be understood.

Moreover, if the user executes a total color change or a partial color change on the scatter plot graph that is being displayed, the color change is reflected on the numerical data items of the list data (either or both of List 1 and List 2) that is selected as the reference. Thus, the mutual relationship between the plot graph, which is being displayed, and the numerical data items of the list data can easily be learnt from the color change.

In each of the above-described embodiments, red (Red), blue (Blue), green (Grn) and yellow (Yllw) are described as colors which can be designated for the numerical data items of the list data. However, colors other than these colors may be designated, and such a configuration may be adopted that more than five colors can be designated.

The operational processes by the electronic calculator 10 described in the embodiments, that is, the processes illustrated in the flow charts of FIG. 5, FIG. 14, FIG. 19 and FIG. 20, may be stored as a computer-executable program in a storage medium (recording medium 17) such as a memory card (e.g., ROM card, RAM card), a magnetic disk (e.g., a flexible disk, a hard disk), an optical disc (e.g., a CD-ROM, a DVD) or a semiconductor memory, and may be provided. By reading the program stored in this storage medium, the computer (CPU 11) of the electronic calculator 10 can execute the same processes as described above.

The data of the program for realizing the above-described processes may be transmitted via communication network (public network) in the form of a program code. By receiving this program by a communication device (communication control unit 18) connected to the communication network, the computer (CPU 11) of the electronic calculator 10 can execute the same processes as described above.

The present invention is not limited directly to the above-described embodiments. In practice, the structural elements can be modified and embodied without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A graph display apparatus comprising:
    a display unit;
    a list input unit configured to input a plurality of lists of data, each list including a plurality of numerical data items;
    a color designation unit configured to designate a plurality of different colors for the numerical data items of the lists of data input by the list input unit;
    a list storage unit configured to store the lists of data input by the list input unit and information of the colors designated for the numerical data items by the color designation unit such that numerical data items and the information are associated with each other;
    a menu display unit configured to display a reference select menu prompting a user to designate one of "X," "Y," and "X&Y" as a reference for color-displaying a graph by the display unit; and
    a graph display unit configured to plot, on X-Y coordinates of the display unit, points having numerical data items of a first one of the plurality of lists of data stored in the list storage unit as X values and numerical data items of a second one of the plurality of lists of data stored in the list storage unit as Y values, such that:
    when "X" is designated as the reference on the displayed reference select menu, the graph display unit displays plot points in a single color in accordance with colors designated for numerical data items of a list corresponding to the X values;
    when "Y" is designated as the reference on the displayed reference select menu, the graph display unit displays plot points in a single color in accordance with colors designated for the numerical data items of a list corresponding to the Y values; and
    when "X&Y" is designated as the reference on the displayed reference select menu, the graph display unit (i) displays plot points in a single color when colors designated for the numerical data items of respective lists corresponding to each of the X and Y values thereof are the same, and (ii) displays plot points in a special display mode, which is different from a display mode in which the plot points are displayed in a single color, when colors designated for the numerical data items of respective lists corresponding to each of the X and Y values thereof are different.

2. The graph display apparatus according to claim 1, further comprising:
    a graph color change unit configured to individually change a color of the plot points displayed by the graph display unit; and
    a graph data color change unit configured to change a color of numerical data items of the lists of data which correspond to one of the X values and the Y values in accordance with the change of the color of the plot points, when one of "X" and "Y" is designated as the reference on the displayed reference select menu.

3. The graph display apparatus according to claim 1, wherein each of the plot points displayed in the special display mode is displayed as a frame-shaped plot point.

4. A graph display method for use in a graph display apparatus including a color display unit, the method comprising:
    receiving input of a plurality of lists of data, each list including a plurality of numerical data items;
    receiving designations of a plurality of different colors for the numerical data items of the input lists of data;
    storing, in a memory of the graph display apparatus, the input lists of data and information of the colors designated for the numerical data items such that the numerical data items and the information are associated with each other;
    displaying a reference select menu prompting a user to designate one of "X," "Y," and "X&Y" as a reference for color-displaying a graph by the color display unit; and
    plotting, on X-Y coordinates of the color display unit, points having numerical data items of a first one of the plurality of lists of data stored in the memory as X values and numerical data items of a second one of the plurality of lists of data stored in the memory as Y values, such that:
    when "X" is designated as the reference on the displayed reference select menu, the plot points are displayed in a single color in accordance with colors designated for numerical data items of a list corresponding to the X values;
    when "Y" is designated as the reference on the displayed reference select menu, the plot points are displayed in a single color in accordance with colors designated for the numerical data items of a list corresponding to the Y values; and
    when "X&Y" is designated as the reference on the displayed reference select menu, (i) the plot points are displayed in a single color when colors designated for the numerical data items of respective lists corresponding to each of the X and Y values thereof are the same, and (ii) the plot points are displayed in a special display mode, which is different from a display mode in which the plot points are displayed in a single color, when colors designated for the numerical data items of respective lists corresponding to each of the X and Y values thereof are different.

5. The method according to claim 4, further comprising:
    individually changing a color of any of the displayed plot points to another color; and
    changing the information of the color for the numerical data items which correspond to one of an X value and a Y value of the point in accordance with the change of the color of the plot points, when one of "X" and "Y" is designated as the reference on the displayed reference select menu.

6. A graph display apparatus comprising:
    a color display unit;
    a memory; and
    a processor configured to execute processing comprising:
    prompting a user to input a plurality of lists of data, each list including a plurality of numerical data items;
    prompting the user to designate a plurality of different colors for the numerical data items of the input lists of data;
    storing the input lists of data and information of the colors designated for the numerical data items in the memory such that the numerical data items and the information are associated with each other;

displaying a reference select menu prompting a user to designate one of "X," "Y," and "X&Y" as a reference for color-displaying a graph by the color display unit; and plotting, on X-Y coordinates of the color display unit, points having numerical data items of a first one of the plurality of lists of data stored in the memory as X values and numerical data items of a second one of the plurality of lists of data stored in the memory as Y values, such that:

when "X" is designated as the reference on the displayed reference select menu, the plot points are displayed in a single color in accordance with colors designated for numerical data items of a list corresponding to the X values;

when "Y" is designated as the reference on the displayed reference select menu, the plot points are displayed in a single color in accordance with colors designated for the numerical data items of a list corresponding to the Y values; and when "X&Y" is designated as the reference on the displayed reference select menu, (i) the plot points are displayed in a single color when colors designated for the numerical data items of respective lists corresponding to each of the X and Y values thereof are the same, and (ii) the plot points are displayed in a special display mode, which is different from a display mode in which the plot points are displayed in a single color, when colors designated for the numerical data items of respective lists corresponding to each of the X and Y values thereof are different.

7. The graph display apparatus according to claim 6, wherein the processor is configured to execute further processing comprising:

individually changing a color of any of the displayed plot points to another color; and changing the information of the color for the numerical data items which correspond to one of an X value and a Y value of the point in accordance with the change of the color of the plot points, when one of "X" and "Y" is designated as the reference on the displayed reference select menu.

* * * * *